United States Patent [19]
Tanbara et al.

[11] Patent Number: 5,870,645
[45] Date of Patent: Feb. 9, 1999

[54] CAMERA FOR USE WITH A COMPACT FILM CARTRIDGE

[75] Inventors: Yasuo Tanbara, Hino; Nobuyuki Tanaka, Hidaka, both of Japan

[73] Assignee: Olympus Optical Co., Ltd., Tokyo, Japan

[21] Appl. No.: 892,481

[22] Filed: Jul. 14, 1997

Related U.S. Application Data

[63] Continuation of Ser. No. 371,003, Jan. 10, 1995, abandoned.

[30] Foreign Application Priority Data

Jan. 17, 1994 [JP] Japan .................................. 6-003105

[51] Int. Cl.$^6$ .................................................. G03B 17/02
[52] U.S. Cl. ........................................... 396/539; 396/540
[58] Field of Search .............................. 354/288, 149.11, 354/152; 396/535, 539, 540, 354

[56] References Cited

U.S. PATENT DOCUMENTS

| | | |
|---|---|---|
| 3,481,261 | 12/1969 | Fischer et al. . |
| 4,771,303 | 9/1988 | Matsumoto et al. ............... 354/195.12 |
| 4,935,761 | 6/1990 | Suzuki et al. ............................ 354/288 |
| 5,001,505 | 3/1991 | Tosaka et al. ......................... 354/173.1 |
| 5,079,584 | 1/1992 | Nakamura ................................ 354/484 |
| 5,150,140 | 9/1992 | Kitazawa ............................... 354/145.1 |
| 5,394,214 | 2/1995 | Petruchik ................................. 354/288 |
| 5,410,378 | 4/1995 | Tasaka et al. ....................... 354/149.11 |
| 5,426,478 | 6/1995 | Katagiri et al. .................... 354/149.11 |

FOREIGN PATENT DOCUMENTS 5-142641 6/1993 Japan .
5-165166 6/1993 Japan .

*Primary Examiner*—David M. Gray
*Assistant Examiner*—Michael Dalakis
*Attorney, Agent, or Firm*—Frishauf, Holtz, Goodman, Langer & Chick

[57] ABSTRACT

A camera for use with a compact film cartridge having a battery arranged in the front end portion of a grip portion, and a cartridge chamber in which a compact film cartridge is stored is arranged at the boundary between the grip portion and a camera body. A motor is arranged between the battery and the cartridge chamber. A main capacitor for causing an electronic flash to emit light is horizontally arranged above the cartridge chambers and motor. In the camera arranged as described above, although the camera body and a lens barrel are smaller than those of a conventional camera in order to achieve miniaturization commensurate with miniaturization of the film, the grip portion has a size and height which are equal to those of the grip portion of the conventional camera. Accordingly, in the camera, of the present invention a release operation can be easily performed, and a shape having good holding properties can be obtained.

3 Claims, 3 Drawing Sheets

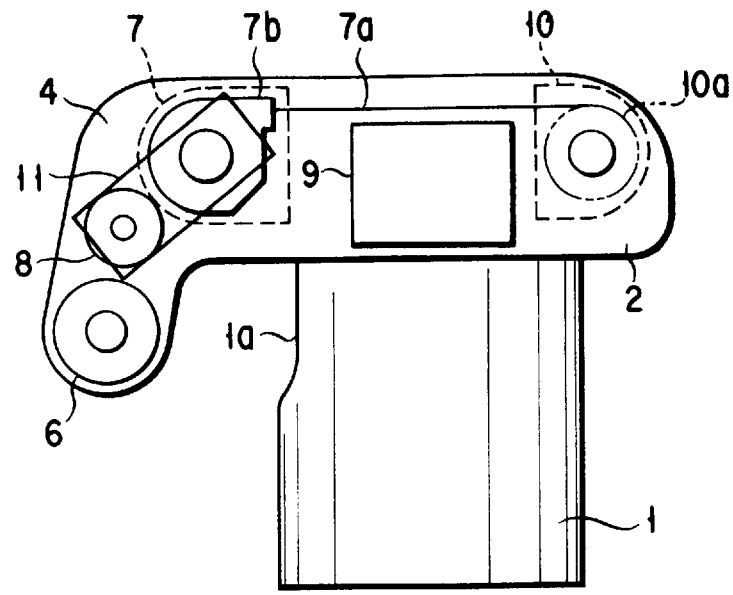
F I G. 1A
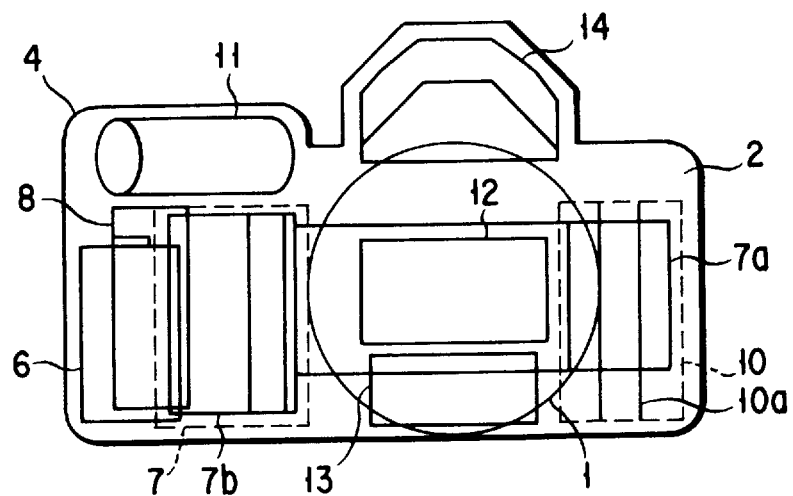
F I G. 1B

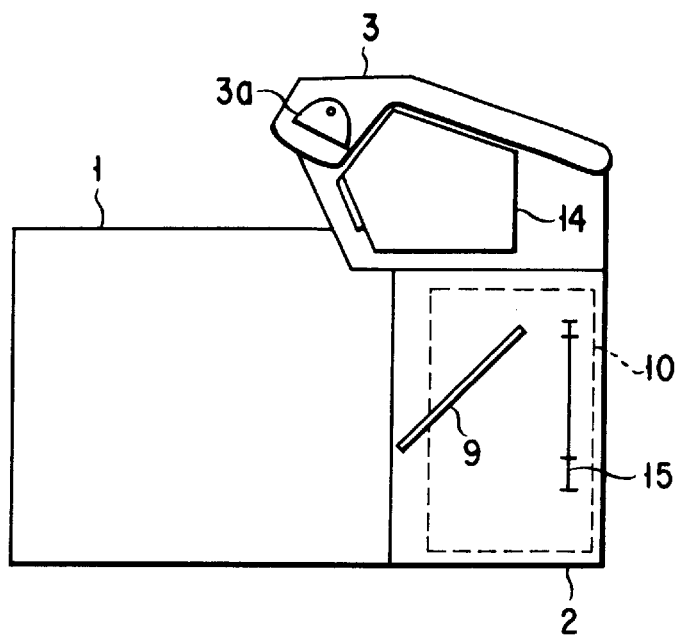
F I G. 3
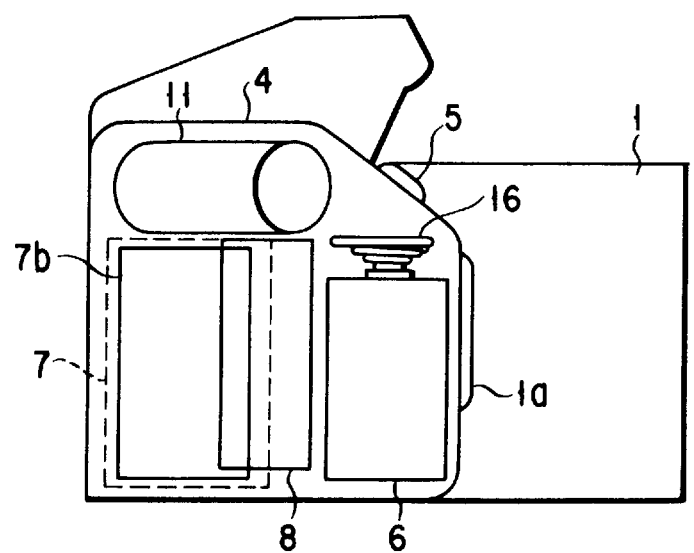
F I G. 4

CAMERA FOR USE WITH A COMPACT FILM CARTRIDGE

This application is a continuation of application Ser. No. 08/371,003, filed Jan. 10, 1995, abandoned.

BACKGROUND OF THE INVENTION

1. Field of the Invention

The present invention relates to a camera and, more particularly, a camera in which components arranged inside the camera are optimally arranged to cope with miniaturization of the camera.

2. Description of the Related Art

At present, a film popularly used in a camera is a 35-mm film having a width of 35 mm and stored in a 135-format cartridge.

In recent years, however, with progress having been made in film techniques, there have been proposed a lot of compact films on which photographic information or the like can be magnetically recorded.

For example, a technique associated with a small-format color negative film is disclosed in Jpn. Pat. Appln. KOKAI Publication No. 5-165166, and a compact film cartridge associated with a technique of easily confirming a trimming area on a film is disclosed in Jpn. Pat. Appln. KOKAI Publication No. 5-142641.

When such a film is used, a compact and lightweight camera can be realized, and a zoom lens at a high magnification can be easily used.

However, when an overall camera is miniaturized without changing the conventional component arrangement inside the camera to cope with the miniaturization of the a film, the holding properties related to the gripping properties and operability of the camera are degraded to cause camera shake.

In addition, when the position of a release button is lowered to cope with miniaturization of the camera, the release button is not easily operated, and a camera shake easily occurs.

For this reason, it has been difficult to increase the magnification of the photographic lens in compact cameras, and more particularly, to perform telephotography by changing the photographic lens into a zoom lens.

SUMMARY OF THE INVENTION

It is, therefore, an object of the present invention to provide a new and improved camera in which a camera shake occurring in taking a photograph, and particularly, a camera shake occurring in taking a telephotograph upon changing a photographic lens into a zoom lens can be prevented, and good holding properties can be obtained to cope with miniaturization of the camera.

It is another object of the present invention to provide a camera in which a release operation can be easily performed, and good holding properties can be obtained to cope with miniaturization of the camera.

According to one aspect of the present invention, there is provided a camera having a cartridge storage chamber, arranged in a camera main body, for storing a cartridge and a winding chamber for winding a film from the cartridge, comprising: a motor for performing at least one of winding and rewinding operations for the film; a battery for a power supply of the camera; a main capacitor for causing an electronic flash to emit light; and a camera holding grip in which one of the motor, the battery, and the main capacitor is arranged to be substantially close to one of the cartridge storage chamber and the film winding chamber, and at least one of remaining two of the motor, the battery, and the main capacitor is arranged at one of portions above and below the one of the motor, the battery, and the main capacitor arranged to be substantially close to the one of the cartridge storage chamber and the film winding chamber.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the illustrate presently preferred embodiments of the invention and, together with the general description given above and the detailed description of the preferred embodiments given below, serve to explain the principles of the invention.

FIG. 1A is a plan view showing the internal mechanisms of a camera according to an embodiment of the present invention when viewed from the upper direction and shows the lateral arrangement of components in the camera;

FIG. 1B is a front view showing the internal mechanisms of the camera according to the embodiment when viewed from the front side of the camera and shows the vertical arrangement of the components in the camera;

FIG. 3 is a side view showing the internal mechanisms of the camera according to the embodiment of the present invention when viewed from a spool chamber side; and FIG. 4 is a side view showing the internal mechanisms of the camera according to the embodiment of the present invention when viewed from a grip side opposing the spool chamber.

DETAILED DESCRIPTION OF THE PREFERRED EMBODIMENTS

Figure 2:
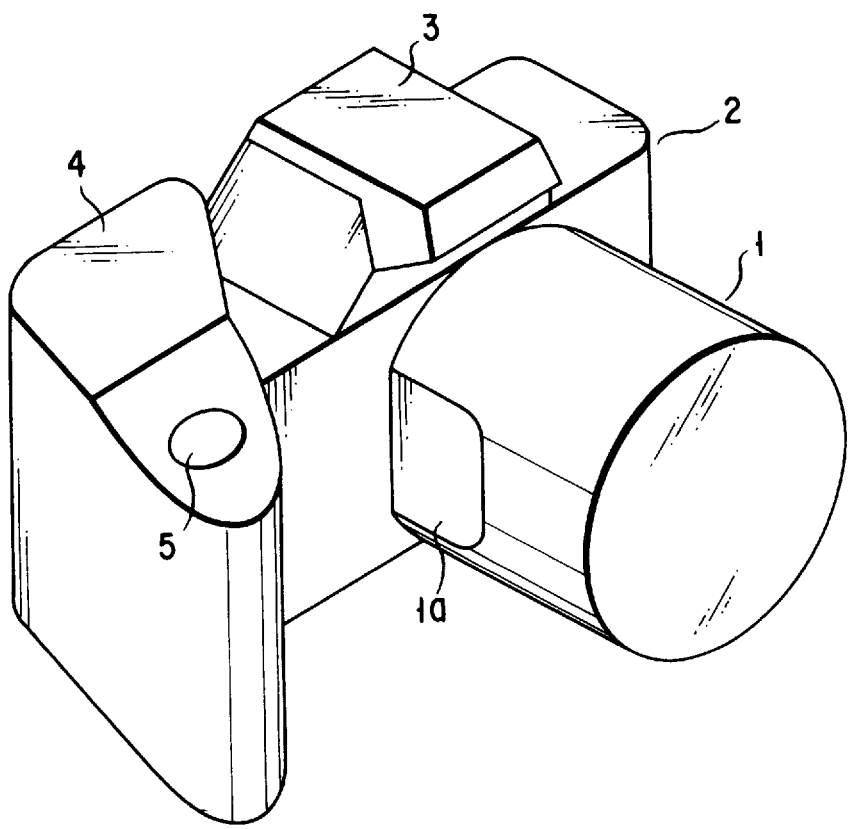
FIG. 2 a perspective view showing the outer appearance of the camera according to the embodiment of the present invention.

Reference will now be made in detail to the presently preferred embodiments of the invention as illustrated in the accompanying drawings, in which like reference characters designate like or corresponding parts throughout the several drawings.

An embodiment of the present invention will be described below with reference to the accompanying drawings.

FIG. 2 is a perspective view showing the outer appearance of a camera according to an embodiment of the present invention.

Referring to FIG. 2, a lens barrel 1 is arranged to project from the front surface of a camera body 2, and a notch 1a is formed in a proximal portion of the lens barrel 1 to prevent fingers from being brought into contact with the lens barrel 1 when a user grips a grip portion 4 (will be described later).

An electronic flash portion 3 in which a viewfinder and an electronic flash are incorporated is arranged on the upper portion of the camera body 2. The grip portion 4 is arranged on the left end of the camera body 2 in FIG. 2 such that the grip portion 4 is slightly inclined and projects from the front surface of the camera body 2. A release button 5 is arranged on the upper portion of the grip portion 4.

In the camera, arranged as described above, according to this embodiment, the camera body 2 and the lens barrel 1 are smaller than those of a conventional camera commensurate with miniaturization of the film. However, the grip portion 4 has the same size and height as the grip portion of a conventional camera, thereby obtaining a shape having good holding properties.

FIG. 1A is a plan view showing the internal mechanisms of the camera according to the embodiment of the present invention when viewed from the upper direction and shows the horizontal arrangement of the components in the camera. FIG. 1B is a front view showing the internal mechanisms of the camera when viewed from the front direction of the camera and shows the vertical arrangement of the components in the camera.

Referring to FIGS. 1A and 1B, a battery 6 is arranged in the front end portion of the grip portion 4, and a cartridge chamber 7 in which a compact film cartridge 7b is stored is arranged at the boundary between the grip portion 4 and the camera body 2.

In this case, as a compact film, a film smaller than a 35-mm film having a standard size, e.g., a 21.6-mm film or the like, is used.

A motor 8 is arranged between the battery 6 and the cartridge chamber 7, and a main capacitor 11 for charging the electronic flash portion 3 to cause an electronic flash to emit light is horizontally arranged above the cartridge chamber 7 and the motor 8.

A film 7a drawn from the cartridge chamber 7 passes through the rear portion of a mirror 9 arranged in a mirror box in the central portion of the camera body 2, and is wound around a spool 10a in the spool chamber 10 arranged in the left end of the camera body 2 in FIGS. 1A and 1B.

An aperture 12 formed in the camera body 2 is located in front of the film 7a. This aperture 12 determines the size of a frame.

An automatic focusing (AF) sensor 13 is arranged in the lower portion of the camera body 2. The position of the bottom surface of the camera according to this embodiment is determined by the AF sensor 13 or the bottom surface of the lens barrel 1.

A pentaprism 14 is arranged in the upper portion of the camera body 2.

Note that, in this embodiment, although the battery 6 and the motor 8 are arranged side by side in the cartridge chamber 7, components which can be arranged in the cartridge chamber 7 are not limited to the battery 6 and the motor 8. One or two of the battery 6, the motor 8, and the main capacitor 11 may be arranged in the cartridge chamber 7.

Moreover, in this embodiment, although the main capacitor 11 is horizontally arranged above the cartridge chamber 7 and the motor 8, a component which can be arranged above the cartridge chamber 7 and the motor 8 is not limited to the main capacitor 11. Of the battery 6, the motor 8, and the main capacitor 11, at least one of which is not arranged in the cartridge chamber 7 may be arranged above the cartridge chamber 7 and the motor 8.

In this embodiment, although the main capacitor 11 is horizontally arranged above the cartridge chamber 7 and the motor 8, the position where the main capacitor 11 is arranged is not limited to a space above the cartridge chamber 7 and the motor 8. The main capacitor 11 may be arranged below the cartridge chamber 7 and the motor 8.

In this embodiment, although the cartridge chamber 7 is arranged in the grip portion 4, a chamber which is arranged in the grip portion 4 is not limited to the cartridge chamber 7. The spool chamber 10 may be arranged in the grip portion 4. More specifically, in this embodiment, the cartridge chamber 7 and the spool chamber 10 may be replaced with each other.

FIG. 3 is a side view showing the internal mechanisms of the camera according to the embodiment of the present invention when viewed from the spool chamber 10 side, and FIG. 4 is a side view showing the internal mechanisms of the camera when viewed from the grip portion 4 side.

Referring to FIG. 3, the lens barrel 1 is arranged to project from the front surface of the camera body 2. In the camera body 2, the spool chamber 10 and the mirror 9 provided in the mirror box are arranged. A shutter 15 is arranged behind the aperture 12 (FIG. 1B), and the shutter 15 controls an exposure time for the film 7a (FIGS. 1A and 1B).

The electronic flash portion 3 having a reflective shade 3a for an electronic flash is arranged above the pentaprism 14.

Although the height of the overall camera is determined by the electronic flash portion 3, the camera body 2 on the spool chamber 10 side is considerably compact.

In contrast to this, referring to FIG. 4, the camera body 2 on the grip portion 4 side increases in size because the cartridge chamber 7, the main capacitor 11, the motor 8, the battery 6, and a battery contact 16 are housed in the grip portion 4. However, no wasteful space is present in the camera body 2.

The grip portion 4 increases in height because the main capacitor 11 is arranged above the cartridge chamber 7 and the motor 8. For this reason, the release button 5 can be arranged at a position where a user can naturally operate the release button 5.

As described above, according to this embodiment, the components arranged in the camera are concentrated in the grip portion, and at least one of the components vertically overlaps the remaining components. For this reason, even when the overall camera is miniaturized, the grip portion of the camera can be increased in size without forming a wasteful space in the grip portion.

There is, therefore, provided a camera which has a release button arranged at a high position and good holding properties and which does not easily cause camera shake.

According to the above-described embodiment of the present invention, the following arrangements can be obtained.

(1) A camera comprises a storage chamber for storing a compact cartridge in which a film smaller than a 35-mm film is loaded, a winding chamber, having a height almost equal to that of the storage chamber, for winding the film from the compact cartridge loaded in the storage chamber, a driving means for performing at least winding and rewinding operations for the film, a power supply battery, a main capacitor for causing an electronic flash to emit light, and a holding portion in which one or two of the driving means, the power supply battery, and the main capacitor are formed to have a length equal to or smaller than that of the storage chamber and are arranged adjacent to one of the storage chamber and the winding chamber, and at least a remaining one of the driving means, the power supply battery, and the main capacitor is arranged at at least one of portions above and below the one or two of the driving means, the power supply battery, and the main capacitor arranged adjacent to one of the storage chamber and the winding chamber.

(2) The camera described in (1) is characterized in that a photographic sequence signal generating means is arranged above the holding portion.

(3) The camera described in (1) or (2) is characterized in that, in the holding portion, the storage chamber, the driving means, and the power supply battery are arranged to have almost equal heights with respect to the bottom surface of the camera, and the main capacitor is arranged above the storage chamber, the driving means, and the power supply battery.

As has been described above, according to the present invention, there can be provided a camera in which a camera shake occurring in taking a photograph, and particularly, a camera shake occurring in taking a telephotograph upon changing a photographic lens into a zoom lens can be prevented, and good holding properties can be obtained to cope with miniaturization of the camera.

In addition, there can be provided a camera in which a release operation can be easily performed, and good holding properties can be obtained to cope with miniaturization of the camera.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A camera for use with a compact film cartridge, said compact film cartridge having a film smaller than a 35-mm film loaded therein, said camera comprising:
    a camera body including a cartridge storage chamber for storing said compact film cartridge, and a winding chamber for receiving film fed from said compact film cartridge;
    a motor for performing at least one of a winding and rewinding operation of said film between said compact film cartridge and said winding chamber:
    a battery for supplying power;
    a main capacitor for causing an electronic flash to emit light;
    a camera holding grip extending from a front wall of said camera body and having provided therein said motor, said battery, said main capacitor and said cartridge storage chamber; and
    a release button arranged on said camera holding grip; wherein:
        said motor is arranged at an angle substantially adjacent to and in front of said cartridge storage chamber;
        said battery is arranged in front of said motor;
        said main capacitor is horizontally arranged above said motor and above said cartridge storage chamber on a side of an optical axis of said camera with respect to a film feeding direction at an inclination of a predetermined angle; and
        said release button is arranged on said camera holding grip above said battery.

2. A camera according to claim 1, wherein said cartridge storage chamber and said winding chamber each have substantially equal heights from a bottom of said camera body, and said battery has a height that is substantially equal to or less than the height of said cartridge storage chamber.

3. A camera for use with a compact film cartridge, said compact film cartridge having a film smaller than a 35-mm film loaded therein, said camera comprising:
    a camera body;
    a camera holding grip portion extending from a front wall of said camera body;
    a lens barrel projecting from said camera body, said lens barrel having a notch on a side wall thereof disposed toward said camera holding grip portion, said notch being provided at a position to prevent a user's fingers from being brought into contact with said lens barrel during operation of said camera;
    a cartridge storage chamber for holding said compact film cartridge, said cartridge storage chamber being arranged in said camera body on a side of said camera holding grip portion with respect to an aperture of said camera;
    a motor for generating a driving force for performing at least one of a winding and rewinding operation of the film in said compact film cartridge, said motor having a longitudinal length substantially equal to or less than a longitudinal length of said cartridge storage chamber;
    a battery for supplying power to said camera, said battery also having a longitudinal length substantially equal to or less than the longitudinal length of said cartridge storage chamber;
    a main capacitor for causing an electronic flash to emit light, said main capacitor also having a longitudinal length substantially equal to or less than the longitudinal length of said cartridge storage chamber; and
    a release button arranged on said camera holding grip portion;
wherein:
    said motor is arranged in said camera holding grip portion substantially adjacent to and in front of said cartridge storage chamber at an angle;
    said battery is arranged in said camera holding grip portion in front of said motor;
    said main capacitor is horizontally arranged in said camera holding grip portion above said motor and said cartridge storage chamber on a side of an optical axis of said camera with respect to a film feeding direction at an inclination of a predetermined angle; and
    said release button is arranged on said camera holding grip above said battery.

* * * * *